(No Model.)
L. BLUE.
HAND CORN SHELLING DEVICE.
No. 298,937. Patented May 20, 1884.
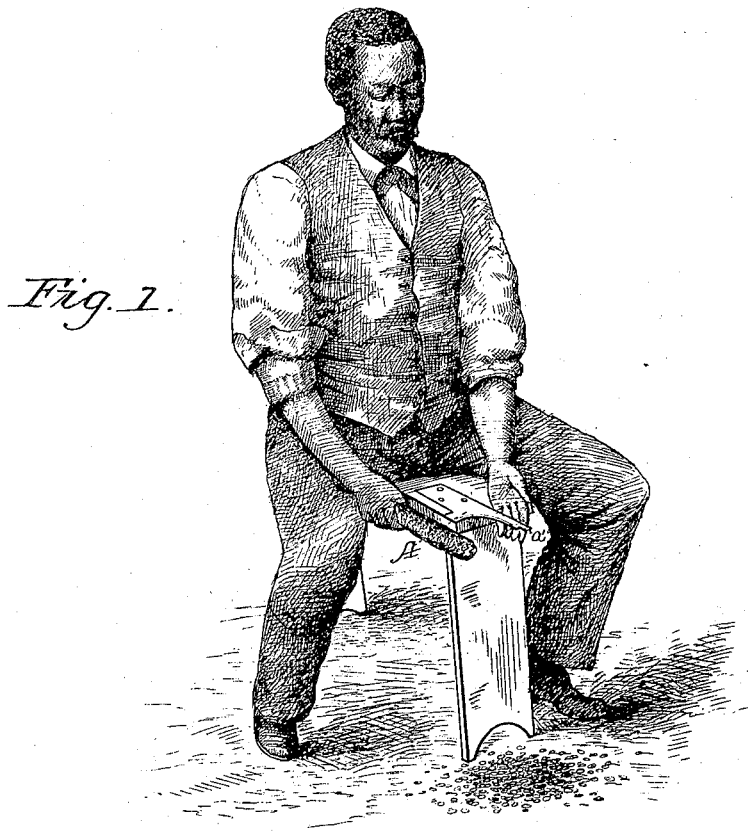
Fig. 1.
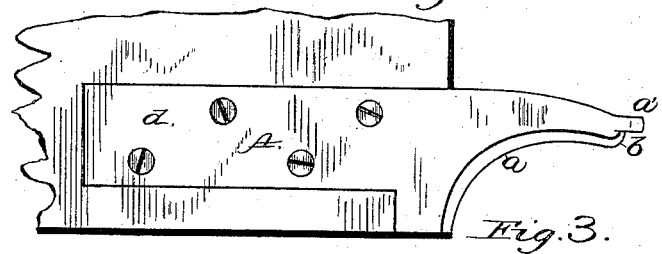
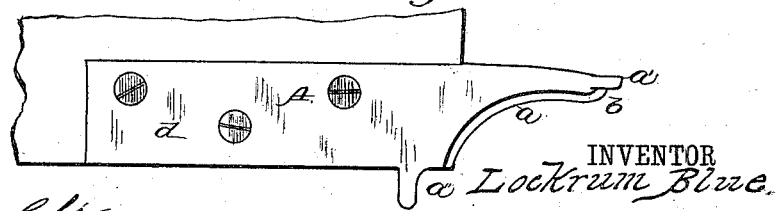
WITNESSES:
J. W. Reynolds
Edward E. Ellis
INVENTOR
Lockrum Blue
BY O. E. Duff
ATTORNEY
N. PETERS. Photo-Lithographer, Washington, D. C.

United States Patent Office

LOCKRUM BLUE, OF WASHINGTON, DISTRICT OF COLUMBIA.

HAND CORN-SHELLING DEVICE.

SPECIFICATION forming part of Letters Patent No. 298,937, dated May 20, 1884.

Application filed March 20, 1884. (No model.)

*To all whom it may concern:*

Be it known that I, LOCKRUM BLUE, of Washington, in the District of Columbia, have invented certain new and useful Improvements in Hand Corn-Shelling Devices; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention has relation to hand corn-shelling devices for rapidly and effectually removing the grain from ears of corn.

It has for its object to provide a device so simplified in form as to reduce the cost of manufacture to a minimum, and thereby enable it to be placed upon the market as a novel and cheap article of manufacture.

To this end the invention consists in the device as constructed, and in the combination thereof with a suitable support, as will be hereinafter distinctly described and claimed.

Reference being had to the accompanying drawings, Figure 1 represents an operator with the device in readiness for use, in order to more clearly illustrate the manner of removing the grain from the cob. Figs. 2 and 3 represent, respectively, views in detail, showing in the last-named figure a slight modification.

Referring to the several parts by the letters, A represents the shelling device, which consists of an oblong blade or plate of metal, preferably of cast-steel, having its shank formed with screw-holes, by which it can be secured to a bench, as shown, or any other suitable support. At the outer end it is formed with a semicircular or concave portion, $a$, the lower edge of which is slightly sharpened, and at its extreme outer end is a tooth or projection, $a'$. In the modification shown in Fig. 3 I have provided at the inner end of said concaved portion a corresponding tooth, $a''$, so that in case one should become broken off the other will be left, with which the same result can be accomplished. I have found that the most convenient manner in which the shelling of corn with this device can be accomplished is to screw it to a bench in such manner as to allow its concaved end to project outward therefrom, and then to sit astride of the bench, as represented in Fig. 1, although it will be obvious that it can be used in many ways different from this.

$b$ represents an offset or shoulder at the junction of the blade and tooth, which assists in the removal of two rows of grain when an ear is started for shelling.

The teeth $a'$ $a''$ are what I term "starters" for the ear to be shelled, in that by placing the larger or butt end of an ear against the same so as to bring it in the space between two rows of grain, and then drawing said ear upward or backward against the tooth, two rows of the grain are removed in a most effectual manner. After the shelling has been thus started, the ear is revolved against the concave or knife edge, which rapidly removes the remaining rows.

This device will be found especially useful to farmers for performing the well-known "nubbing" and "butting" operation—that is, removing the imperfect grains from the ends of the ears, so as to render it possible to use the remaining grain for planting purposes.

As a commercial article these devices can be done up in packages for transportation at a small cost.

The operation is as follows: The operator desiring to start an ear picks it up by its smaller end, preferably, and places its larger end against the tooth $a'$, bringing such tooth in the space between two rows of grain. He then draws the ear upward or backward against the tooth, which operates in a most effectual manner to remove two rows of the grain at one time. The ear is then placed in and turned around and against the concave knife-edged portion, and the remaining grain is thus shelled off rapidly without regard to following the direction of the grain rows.

For nubbing and butting the ear, or, in other words, removing the worthless grain from each end, such as are unfit for planting purposes, this device will be found extremely useful.

Having thus described my invention, what I claim, and desire to secure by Letters Patent, is—

1. The shelling plate or blade formed with the starting or shelling tooth and the shelling-edge, and suitably adapted to be secured, substantially as described.

2. The plate or blade formed with the starting or shelling tooth, the shelling-edge, and the shank, in combination with a suitable support, substantially as described.

In testimony that I claim the foregoing as my own I affix my signature in presence of two witnesses.

LOCKRUM BLUE.

Witnesses:
   EDWARD E. ELLIS,
   M. P. CALLAN.